Nov. 17, 1959     F. M. COTTLE, JR     2,913,244
MODEL AIRCRAFT CONTROL
Filed Feb. 21, 1958     2 Sheets-Sheet 1
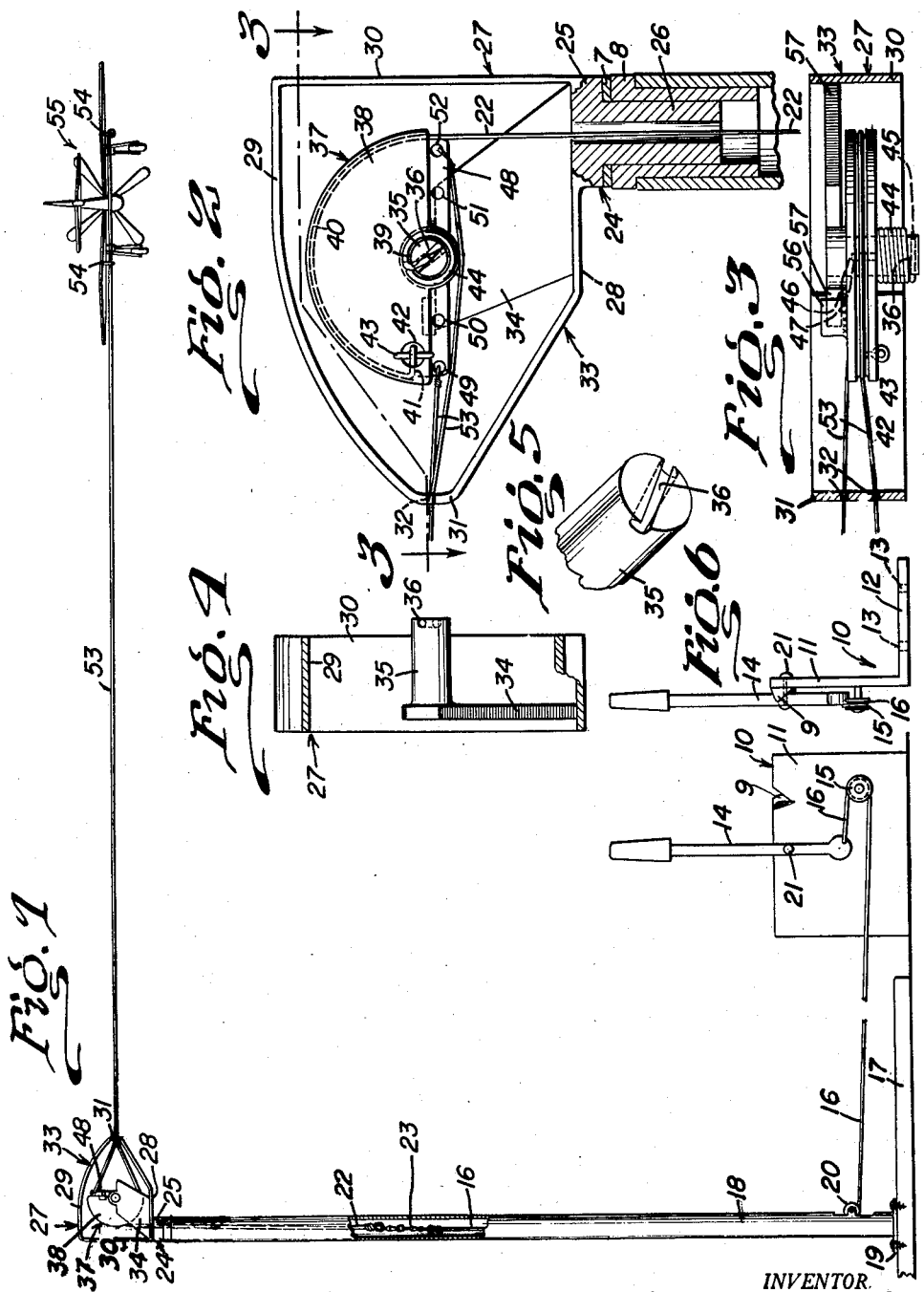
INVENTOR.
Francis M. Cottle, Jr.
BY
Attorneys

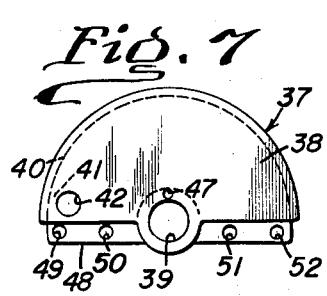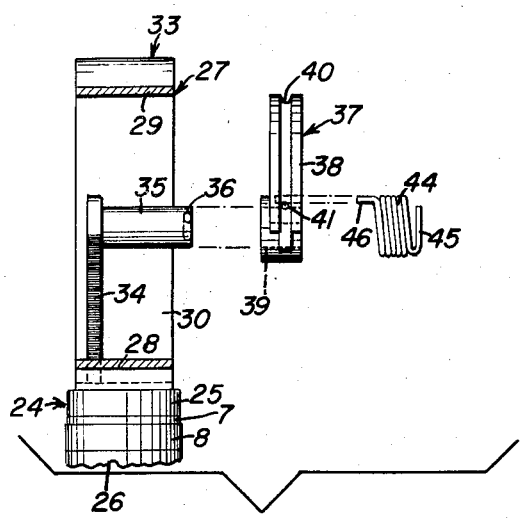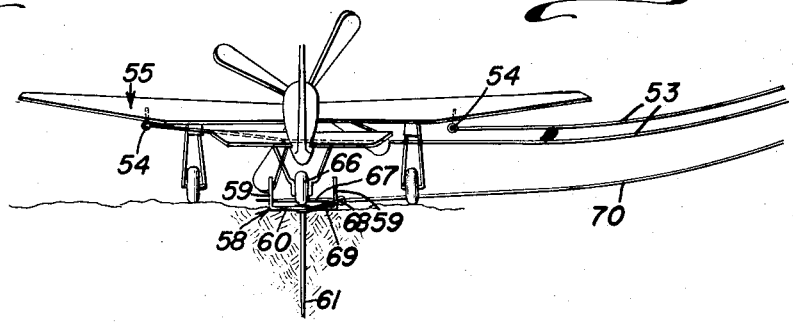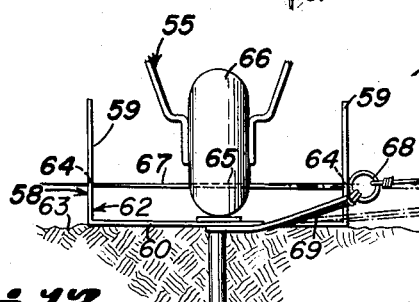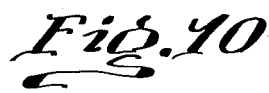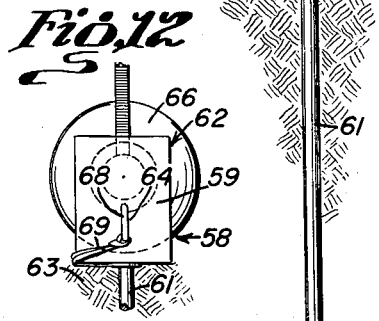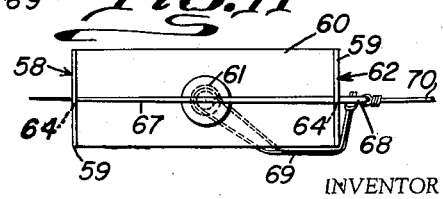

United States Patent Office
2,913,244
Patented Nov. 17, 1959

2,913,244

MODEL AIRCRAFT CONTROL

Francis M. Cottle, Jr., Fresno, Calif., assignor of one-half to Leon Boro, Fresno, Calif.

Application February 21, 1958, Serial No. 716,814

3 Claims. (Cl. 272—31)

This invention relates to a model aircraft control assembly.

This invention is an improvement over the Model Aircraft Control Device shown and described in my co-pending application, Serial No. 638,827, filed February 7, 1957.

The object of this invention is to provide a model aircraft control assembly which is of more simple construction and which provides a means whereby certain of the parts shown in my prior patent application can be eliminated so that the model aircraft control assembly of the present invention can be made or produced and sold at less cost and wherein the model aircraft control of the present invention incorporates certain novel features which will be later pointed out in this application.

A still further object of the invention is to provide a model aircraft control assembly which includes a manual means for controlling flight of the model aircraft so that the model aircraft can be caused to perform various acrobatics and wherein the aircraft can be made to climb or dive or the like, the flight of the aircraft adapted to be controlled from a remote location by means of a readily accessible control stick.

A still further object of the invention is to provide a model aircraft control assembly which includes a novel release trip mechanism which will permit the user or operator of the device to readily control take-off of the aircraft from the ground so that with the engine of the aircraft operating, the aircraft can be made to ascend by a convenient manipulation of the control line or pull line.

A still further object of the invention is to provide a model aircraft control assembly which includes a manual control stick that is spaced from an upright standard, the standard having a control head arranged adjacent the upper end thereof, and wherein the control head is connected to the model aircraft which is being flown, so that by properly manually manipulating the control stick, the aircraft can be caused to readily perform various acrobatics or motions so as to provide much pleasure or interest to the persons utilizing or witnessing the flight of the model aircraft.

Further advantages and features of the invention will become apparent when taken in connection with the following detail description and accompanying drawings in which:

Figure 1 is an elevational view illustrating the model aircraft control assembly of the present invention, and with parts broken away and in section.

Figure 2 is a fragmentary enlarged elevational view illustrating the control head, and with parts broken away and in section.

Figure 3 is a sectional view taken on the line 3—3 of Figure 2.

Figure 4 is a fragmentary sectional view taken at right angles to the view shown in Figure 2 and showing the frame of the control head.

Figure 5 is a fragmentary perspective view illustrating an end of the bushing which has a slot therein.

Figure 6 is an elevational view taken at right angles to the view shown in Figure 1, and showing the support member which has the control stick connected thereto.

Figure 7 is an elevational view illustrating the rotary body member which forms part of the control head.

Figure 8 is a fragmentary sectional view illustrating certain construction details of the control head.

Figure 9 is a rear elevational view of a model aircraft showing the release mechanism therefor.

Figure 10 is an enlarged elevational view of the assembly of Figure 9.

Figure 11 is a plan view of the release trip mechanism.

Figure 12 is a side elevational view of the device of Figures 10 and 11.

Referring in detail to the drawings, the numeral 10 indicates an L-shaped support member or stand which includes a vertically disposed leg 11 and a horizontally disposed leg 12, and the leg 12 is provided with openings 13, Figure 6, whereby suitable securing elements can be extended through the openings 13 for anchoring the support member 10 in place.

The numeral 14 indicates a control stick which is pivotally connected to the leg 11 by means of a pivot pin 21, and the numeral 15 indicates a pulley which is also connected to the leg 11. A cable or line 16 has one end connected to the lower end of the control stick 14, and the cable 16 is trained over the pulley 15.

Spaced from the support member 10 is a horizontally disposed base 17, and the numeral 18 indicates an upstanding hollow tube or standard 18 which has its lower end secured to the base 17 as at 19. A guide pulley 20 is connected to the lower portion of the standard 18, and the cable 16 is trained over the pulley 20, Figure 1.

The numeral 22 indicates a line or cable which is coupled to the cable 16 through the medium of a swivel coupling 23, Figure 1. The numeral 24 indicates a bearing which is arranged adjacent the upper end of the standard 18, and the bearing 24 includes an upper enlarged cylindrical portion 25 and a lower cylindrical portion 26 of reduced diameter, and the portion 26 is arranged within the upper end of the standard 18. Arranged above the bearing 24 is a frame which is indicated generally by the numeral 27, and the frame 27 forms part of a movable control head which is indicated generally by the numeral 33. It is to be noted from Figure 2 for example, that the frame 27 includes a bottom portion 28, a top portion 29, a back portion 30, and a front portion 31, and the front portion 31 is provided with apertures or openings 32, as for example as shown in Figure 3.

Extending upwardly from the bottom portion 28 and secured thereto or formed integral therewith is a vertically disposed plate portion 34.

Extending outwardly from the upper end of the plate portion 34 and secured thereto or formed integral therewith is a horizontally disposed cylindrical bushing 35 which is provided with a slot 36 in its outer end, Figure 5. The numeral 37 indicates a rotary body member or control wheel, Figure 7, and the body member 37 includes a portion 38 which is of substantially semi-circular formation. The upper or outer portion of the body member 37 is provided with a groove 40, and a portion of the line 22 extends through the groove 40, and this line 22 then extends through a port or opening 41 and then through an opening 42, whereby a suitable securing element such as a peg 43 may be extended through a knot or loop on the end of the line 22 whereby the line 22 is anchored to or connected to the body member 37. Thus, when pressure is applied to the line 22 by means of the control stick 14, it will be seen that the body member 37 will rotate on the bushing 35, for a purpose to be later described.

As shown in Figure 8 for example, a return spring 44 is provided, and the spring 44 has an end portion 45 which engages the slot 36 in the bushing 35, and the spring 44 further includes an end portion 46 which seats in an opening 47 of the body member 37.

Formed integral with the body member 37 or secured thereto is a flange 48, and the flange 48 is provided with a plurality of spaced apart openings or apertures 49, 50, 51 and 52. A pair of cables 53 are connected to certain of these openings 49, 50, 51 and 52, and the other ends of these cables 53 are connected to securing elements 54 which are secured to the model aircraft 55 being flown or operated.

For limiting rotation of the body member 37 in one direction, a stop member 56 projects outwardly from the body member 37, and the stop member 56 is adapted to abut or engage stop portions 57 on the plate portion 34.

As shown in Figures 9 through 12 of the drawings, there is further provided a release trip mechanism which is indicated generally by the numeral 58, and the release trip mechanism 58 is adapted to be used for controlling take-off of the aircraft such as the aircraft 55. The release trip mechanism 58 includes a U-shaped bracket 62 which comprises a horizontally disposed bottom member 60 and upstanding spaced parallel vertically disposed side members 59. The numeral 61 indicates an anchoring member or pin which extends through the bottom member 60 and into engagement with a supporting surface such as the ground 63.

The side members 59 of the bracket 62 are provided with openings 64 that register with an opening or aperture 65 in a wheel 66 of the aircraft 55. The numeral 67 indicates a removable pin which extends through the registering openings 64 and 65, and the pin 67 is provided with an eye 68 on an end thereof. A resilient band 69 has one end connected to the eye 68, and the other end of the band 69 is arranged in engagement with the anchoring member 61, and the band 69 serves to insure that the vibration from the engine of the aircraft will not trip the mechanism before the pull cord 70 is actuated. Thus, when it is desired to permit the aircraft 55 to take off, it is only necessary to pull on the line or cable 70 whereby the pin 67 will be removed from the registering openings 64 and 65 so as to permit the model aircraft to fly.

From the foregoing, it is apparent that there has been provided a model aircraft control mechanism which is an improvement over prior control mechanisms such as the mechanism shown and described in my co-pending application, Serial No. 638,827.

According to the present invention it is to be noted that with the parts arranged as shown in Figure 1 for example, the support member 10 may be arranged at a suitable location, and the support member 10 may be anchored in place by suitable securing elements which are extended through the openings 13 in the horizontal leg 12. Then, the control stick 14 can be gripped and by moving the stick 14 back and forth on its pivot pin 21, it will be seen that tension on the cable 16 will be varied and this will change the tension on the line 22. The line 22 is coupled to the cable 16 by means of the swivel connection 23, and the line 22 extends through the groove 40 in the body member 37 and the line 22 is anchored to the body member 37 by being extended through the openings 41 and 42 whereby a suitable element such as a peg 43 can be arranged in engagement with a loop or knot in the end of the line 22 so as to anchor the line to the body member 37. The body member 37 which has a substantially semi-circular formation as shown in Figure 7, is rotatable on the bushing 35, so that as pressure is applied to or released from the line 22, the body member 37 will be caused to rotate on the bushing 35, since the bushing 35 projects through the opening 39 in the body member 37. When pressure is released on the line 22, the return spring 44 will return the body member 37 to neutral position since the spring member 44 has one end 46 anchored to the opening 47 in the body member 37. The other end of the spring member 45 is anchored to the slot 36 in the end of the bushing 35. It is to be further noted that the pair of lines or cables 53 are connected to a pair of the openings 49, 50, 51 or 52 so that as the body member 37 is rotated by moving the control stick 14, it will be seen that these cables 53 will likewise be moved. Since the cables 53 extend through the openings 32 in the front 31 of the frame 27, it will be seen that with the cables 53 connected to the model aircraft 55 as at 54, the model aircraft 55 can be caused to ascend, or descend, or perform various acrobatics or the like.

The bushing 35 is supported by means of the plate 34 which is secured to or formed integral with the frame 27, and the parts shown in the views such as Figure 2 or Figure 8 form part of a control head which is indicated generally by the numeral 33. The bearing 24 permits the control head 33 to rotate on top of the standard 18 so that as the aircraft 55 circles the standard 18, the control head will rotate therewith. The inter-engaging stop members 56 and 57 provide a means for limiting rotation of the body member 37 in each direction.

In the construction shown in Figures 9 through 12 there is shown a release trip mechanism for use in initially controlling take-off of the aircraft 55. Thus, it is to be noted that one of the wheels 66 of the aircraft 55 is provided with an opening 65 and this opening 65 registers with openings 64 in the side members 59 of the bracket 62, and the bracket 62 is adapted to be anchored in place by means of the pin 61. The pin 67 is then extended through the registering apertures 64 and 65, and the pull line or cable 70 is connected to the eye 68 on the end of the pin 67. The rubber band 69 has one end connected to the eye 68 and its other end connected to the pin 61, and the band 69 serves to insure that vibration from the engine of the aircraft will not prematurely cause the pin 67 to separate whereby the aircraft will not be able to accidentally take off or fly prematurely. With the engine operating, when it is desired to permit the aircraft to take off, it is only necessary to pull the cable 70 which will retract or remove the pin 67 from the registering openings 64 and 65 and this will permit the aircraft engine to cause the plane to fly in the usual manner.

The parts can be made of any suitable material and in different shapes or sizes.

With the trip mechanism shown in Figures 9 through 12, with the wheel locked in place, it will be seen that the aircraft engine can be started and when the engine is operating at the desired speed, the cable 70 can be pulled to permit the aircraft to take off.

In Figure 1 the parts are shown in position for level flight. Due to the provision of the four openings 49, 50, 51 and 52, the lines 53 can be changed for changing or varying the sensitivity of the control, but only two of these positions are used at any one time. In actual use, the stick 14 is located a greater distance from the pylon or standard 18 than that shown in Figure 1 so that the aircraft can be flown from outside the circle in which it travels. The slot 36 is formed so that the ends 45 of the spring 44 will not accidentally become detached therefrom. The support member 10 can be made of a suitable material such as wood or metal or plastic, and suitable pegs can be used for extension through the openings 13 for securing the support member 10 to the ground, lawn, floor or the like. The base 17 may be made of plywood or the like and the standard 18 may be made of steel tubing which can have its lower end secured to the base 17. Ears may be arranged at the lower end of the standard 18 for bolting or securement to the base 17. The control stick assembly of the present invention is very much simplified over that shown in my prior patent application. The control stick is adapted to be arranged in such a manner that the operator stands outside of the circle of flight of the model aircraft.

As previously described, the trip arrangement for releasing the model aircraft after its engine has been started, permits one person alone to fly the model plane by having the plane take off, fly and land without any assistance being required. The pin or nail 61 serves to secure the bracket 62 to the ground 63, and the band 69 prevents the pin 67 from sliding out while the plane's engine is running. Thus, the engine creates a great deal of vibration and the rubber band prevents this vibration from releasing the pin 67. A line 70 may be made of a suitable material such as fabric or metal and the opening 65 may be formed in a wheel 66 by drilling a suitable hole therein, and it is to be understood that this hole can be arranged in any suitable portion of the aircraft such as the plane's tail wheel, tail skid or if a tricycle landing gear plane is used, a hole can be drilled in the outboard landing gear wheel. Thus, before the plane is started, the plane is secured to the trip by inserting the pin 67 through one side of the trip, and then through the plane's tail or outboard wheel and then through the second opening in the other side member 59 and then when the plane is to be released after its engine has been started, the operator pulls the line 70 and the plane immediately starts to travel. Depending upon the direction of movement of the stick 14, the aircraft 55 will be caused to travel in the desired direction or manner.

It is to be noted that the model aircraft control of the present invention is constructed so that the cost of manufacture is much less than that shown in my co-pending application. For example, the present invention avoids the necessity of rack, gear and spring loaded barrel.

The base of the standard or pylon may be of any desired shape as for example it may be triangular or square and can be made of a suitable material such as wood or plastic and it can be secured to the ground or floor by nails, spikes or the like. The standard can be constructed of thin wall tubing and the bearing may be made of nylon. The standard may be telescopic so that the effective height thereof can be varied or changed as desired.

An important advantage or reason for using the member 37 as shown in Figure 7 for example, is that greater freedom of movement is possible. The plurality of openings 49, 50, 51 and 52 insure increased sensitivity or control. The number of these openings can be varied as desired. In Figure 1 the numeral 9 indicates a stop member which serves to limit swinging movement of the stick 14. If desired, the movement of the stick 14 can be synchronized with movement of the cable 70 so that better control of the device can be provided. By having the openings 13 arranged in the leg 12 as shown in Figure 6 for example, it will be seen that there will be no interference with movement of the stick 14. As shown in Figure 2 for example, there is provided a bearing member 8 for coaction with the bearing 24, and a thrust washer 7 may be used between adjacent portions of the bearings 8 and 24.

The stop member 56 is adapted to engage either of the stop portions 57 on the upper end of the member 34 whereby pivotal or rotary movement of the member 37 in either direction will be limited.

The stop member 9 may be made by means of a suitable cut in the leg 11 and this cut portion can then be bent outwardly so as to provide a stop for limiting pivotal movement of the stick 14.

The bearing arrangement as shown in Figure 2, permits 360 degree turns and insures that there will be no binding or dragging. The spring 44, in addition to the previously described functions thereof, also serves to maintain tension on the line 16 at all times so as to make control possible. The arrangement of the openings 49, 50, 51 and 52 eliminates over-control and over-sensitivity.

The airplane is connected to the control lines which are in turn connected through the holes in the control head to the corresponding holes in the control wheel. The climb line is connected to one of three holes in the top half of the control wheel in the vertical position and the dive line is connected to one of the three bottom holes of the control wheel in the vertical position. In relation to the model aircraft, the line connected to the forward portion of the bell crank gives the down motion and the line connected to the back portion gives the climb motion. In a conventional manner, the bell crank is connected to a horn or lever on the elevator of the plane by a bell crank rod in such a manner that when the forward line of the bell crank is pulled towards the outside of the controlling wing edge the elevator will go in a down position causing the aircraft to dive. In a like manner, when the line connected to the back portion of the bell crank is moved out towards the controlling wing edge, the rod connected to the horn or lever on the elevator moves the elevator in an up position causing the aircraft to climb.

Minor changes in shape, size and rearrangement of details coming within the field of invention claimed may be resorted to in actual practice, if desired.

I claim:

1. A model aircraft control comprising a hollow standard defining a pylon, a rotary control head on the upper end of said standard, said control head including a rotary control wheel, cables adjustably connected to said control wheel, a spring member for maintaining tension on the control wheel, an aircraft operatably connected to said cables, a control stand including a stick for controlling actuation of said control wheel, a single line having a portion thereof extending through said pylon and having one end connected to said stick and its other end connected to said control wheel, said control wheel including a body member having a substantially semi-circular formation and being provided with a groove for receiving a portion of said line therein, said line being located in the groove starting at one end of the groove and fixed to the opposite end of the control wheel, a securing element connecting an end of said line to said last named member, said body member further including a flange provided with a plurality of spaced apart openings therein, said cables being connected to certain of the openings in said flange.

2. A model aircraft control comprising a hollow standard defining a pylon, a rotary control head on the upper end of said standard, said control head including a rotary control wheel, cables adjustably connected to said control wheel, a spring member for maintaining tension on the control wheel, an aircraft operatably connected to said cables, a control stand including a stick for controlling actuation of said control wheel, a single line having a portion thereof extending through said pylon and having one end connected to said stick and its other end connected to said control wheel, said control wheel including a body member having a substantially semi-circular formation and being provided with a groove for receiving a portion of said line therein, said line being located in the groove starting at one end of the groove and fixed to the opposite end of the control wheel, a securing element connecting an end of said line to said last named member, said body member further including a flange provided with a plurality of spaced apart openings therein, said cables being connected to certain of the openings in said flange, and a bearing contiguous to the lower end of said control wheel and said bearing including an upper enlarged cylindrical portion and a lower cylindrical portion of reduced diameter, the lower portion of said bearing being arranged within the upper end of the pylon.

3. A model aircraft control comprising a hollow standard defining a pylon, a rotary control head on the upper end of said standard, said control head including a rotary control wheel, cables adjustably connected to said control wheel, a spring member for maintaining tension on the control wheel, an aircraft operatably connected to said cables, a control stand including a stick for controlling actuation of said control wheel, a single line having a portion thereof extending through said pylon and having one end connected to said stick and its other end connected to said control wheel, said control wheel including a body member having a substantially semi-circular formation and being provided with a groove for receiving a portion of said line therein, said line being located in the groove starting at one end of the groove and fixed to the opposite end of the control wheel, a securing element connecting an end of said line to said last named member, said body member further including a flange provided with a plurality of spaced apart openings therein, said cables being connected to certain of the openings in said flange, and a bearing contiguous to the lower end of said control wheel and said bearing including an upper enlarged cylindrical portion and a lower cylindrical portion of reduced diameter, the lower portion of said bearing being arranged within the upper end of the pylon, said control stand including an L-shaped support member embodying a horizontally disposed leg and a vertically disposed leg, said control stick being pivotally connected to said vertically disposed leg, and a pulley connected to said vertically disposed leg, said line being trained over said last named pulley.

References Cited in the file of this patent

UNITED STATES PATENTS

| 1,802,139 | Dacey | Apr. 21, 1931 |
| 2,159,963 | Bonanno | May 30, 1939 |
| 2,499,666 | Mikolajczyk | Mar. 7, 1950 |
| 2,603,910 | Jones | July 22, 1952 |
| 2,775,453 | Biller | Dec. 25, 1956 |

FOREIGN PATENTS

| 600,308 | Great Britain | Apr. 6, 1948 |